United States Patent [19]

Mirick

[11] Patent Number: 5,041,277

[45] Date of Patent: Aug. 20, 1991

[54] METHOD FOR TREATING ASBESTOS

[75] Inventor: William Mirick, Worthington, Ohio

[73] Assignee: Austen Chase Industries, Inc., New York, N.Y.

[21] Appl. No.: 366,589

[22] Filed: Jun. 15, 1989

[51] Int. Cl.$^5$ .......................... B09B 1/00; G21F 9/00; C01F 5/00

[52] U.S. Cl. .................................. 423/659; 423/167; 423/335; 423/DIG. 20; 405/129

[58] Field of Search ............... 423/155, 167, 331, 335, 423/336, 659, DIG. 20; 405/129

[56] References Cited

U.S. PATENT DOCUMENTS

| | | | |
|---|---|---|---|
| 112,650 | 3/1871 | Stevens | 423/167 |
| 1,094,505 | 4/1914 | Whitney | 423/167 |
| 3,297,516 | 1/1967 | Naumann | 423/167 |
| 3,965,284 | 6/1976 | Xanthos et al. | 427/221 |
| 4,347,150 | 8/1982 | Arpin | 252/174.23 |
| 4,401,636 | 8/1983 | Flowers | 423/327 |
| 4,474,742 | 10/1984 | Graceffa et al. | 423/331 |
| 4,693,755 | 9/1987 | Erzinger | 106/169 |
| 4,812,204 | 3/1989 | Delvaux et al. | 423/167 |

FOREIGN PATENT DOCUMENTS

| | | |
|---|---|---|
| 181504 | 2/1907 | Fed. Rep. of Germany . |
| 8910338 | 11/1989 | Japan . |
| 356191 | 8/1931 | United Kingdom . |
| 2015979 | 9/1979 | United Kingdom . |

OTHER PUBLICATIONS

Ulmann'3 s Encyclopedia of Industrial Chemistry, 5th Edition, VCH Verlagsgesellschaft mbH, Weinehim, 1985.

Asbestos, vol. 1, Michaels & Chissick (1979).

Chemical Abstracts, vol. 109, No. 20, Nov. 14, 1988 (Ohio), G. Baldwin et al., "An environmentally Acceptable Treatment Method for Chyrsotile Asbestos Wastes"; 109:175675v.

Primary Examiner—Gary P. Straub
Attorney, Agent, or Firm—Marmorek, Guttman & Rubenstein

[57] ABSTRACT

A method for rendering harmless chrysotile asbestos comprises wetting the asbestos fibers with an aqueous solution containing about 1 to 10% by weight of a weak organic acid, such as trifluoroacetic acid. The weak acid solution hydrolyzes the magnesium oxide units contained in the crystal structure of chyrsotile asbestos, thereby destroying this crystal structure and the fibrous nature of the asbestos. The method may be used on building materials already in place to remove the asbestos fibers contained therein.

13 Claims, 3 Drawing Sheets

1000 X

5000 X 10,000X

1000 X

5000 X 10,000 X

METHOD FOR TREATING ASBESTOS

BACKGROUND OF THE INVENTION

The invention relates to a method for treating magnesium-containing asbestos so as to render it harmless. More particularly, the invention relates to a method for treating chrysotile asbestos with a weak acid solution, thereby destroying its crystalline structure and its fibrous nature.

Asbestos is a commercial term applied to a group of silicate minerals which occur in fibrous form. There are six principal asbestos minerals. Of these six minerals, only one, chrysotile asbestos, belongs to the group classified as serpentine asbestos, that is, minerals characterized by long fibers that are serpentine in shape. The chemical composition of chrysotile asbestos may be represented as: $Mg_3(Si_2O_5)(OH)_4$ or $3MgO.2SiO_2.H_2O$. The other varieties of asbestos are silicates of magnesium, iron, calcium, and sodium. These varieties of asbestos belong to the amphibole (straight fiber) group of minerals. About 95% of world production is the chrysotile form of asbestos.

Due to the unique properties of the asbestos minerals, many different kinds of products were developed during the 1940's through the early 1970's that incorporated asbestos fibers for fire resistance, moisture control, and thermal insulation. Many building products, for example, friable thermal insulation, asbestos-cement pipe, asbestos-cement sheet, floor and roof shingles, transite tiles, accoustical plaster, insulation and fire-retardant paper products, and high-temperature insulation, include asbestos fibers. In the overwhelming majority of cases, these products contain the chrysotile form of asbestos.

For a number of years now it has been recognized that many chronic diseases are associated with the inhalation of airborne asbestos fibers. These diseases include lung cancer, chronic fibrosis of the lung lining, and mesothelioma (a rare but fatal cancer of the lungs). Although not completely understood, it is believed that when an asbestos fiber comes into contact with a living cell, the asbestos fiber irritates the cell lining and leads to its eventual weakening. After such weakening, it is believed the asbestos fiber enters the cell. Once inside the living cell, the asbestos fiber appears to set in motion a collagen synthesis ultimately resulting in chronic fibrosis and a potential for developing carcinoma.

Due to its hazardous nature, there has been a concerted effort by governmental agencies to ban the use and encourage the removal of materials containing asbestos fibers. The U.S. Environmental Protection Agency has set an upper limit of 1% for the allowable asbestos fiber content in building materials. Furthermore, local governmental agencies in many cities, for example, New York City, require the removal of asbestos materials from buildings before they will issue permits for building renovation or demolition. Many safeguards must be employed to prevent inhalation of airborne asbestos fibers by workers and others in the vicinity of the work area. Special masks must be worn by workers handling the asbestos. Any area in a building in which asbestos material is exposed or is being removed must be isolated by partitions from the remainder of the building. Also, the work area must be kept at an atmospheric underpressure to prevent airborne fibers from leaving the area. Needless to say, these measures are both cumbersome and costly. Additionally, disposal of asbestos products removed from the building also remains a problem.

A number of methods have been proposed for rendering asbestos less harmful but without substantially affecting its significant physical and chemical properties. In U.S. Pat. No. 4,401,636 (Flowers) a method is described for treating silicate minerals with an aqueous metal salt solution to form a metal-micelle silicate. The method purports to render the resulting silicate less harmful to living cells while the treated silicate retains most of its asbestos-like properties. However, the method proposed therein is not totally satisfactory since it does not destroy the fibrous nature of the asbestos. According to the method described in U.S. Pat. No. 4,401,636, a metal is added to the crystal structure of the asbestos, thereby forming a metal-micelle which masks the iron-binding sites in the asbestos. According to that patent, the metal-micelle asbestos, when introduced into a living cell, does not react with cellular iron. Therefore, the reaction that is believed to initiate fibrosis should be blocked and biological hazards associated with exposure of living organisms to asbestos should be reduced.

The method described in U.S. Pat. No. 4,401,636 is a significant attempt to reduce the harmful effects of asbestos fibers. However, the method described therein does not destroy the asbestos fibers themselves. The method adds a metal to the crystal structure of the asbestos while allowing the crystal structure and the fibrous nature of asbestos to remain basically intact.

Accordingly, it is an object of the present invention to provide a process for rendering asbestos harmless by destroying its crystalline structure and fibrous nature.

It is another object of the present invention to provide an in situ process for rendering harmless asbestos-containing building materials which are already in use, thereby obviating the need to remove these materials from buildings.

It is yet another object of the present invention to provide such a process which is simple and much less expensive than present methods of removing asbestos-containing building materials from buildings.

SUMMARY OF THE INVENTION

In accordance with the present invention, a simple method for treating the chrysotile form of asbestos to render it harmless is provided. The method, in its broadest embodiment, comprises applying an aqueous solution of a weak acid to a chrysotile-containing materials. The acid solution hydrolyzes the magnesium oxide (MgO) units in the crystal structure, thereby destroying the crystal structure and the fibrous nature of chrysotile asbestos. The aqueous solution should have an acid concentration of about 1–10% by weight. Desirably, the amount of weak acid solution applied to the asbestos-containing material should be in the range of about 2 to 10 parts by volume of the acid solution per 1 part of asbestos.

The inventive method may be used in situ by spraying chrysotile-containing building materials which are already in place with the weak acid solution. Depending on what acid is used, one is able to achieve 90% or greater conversion of the chrysotile asbestos to a new form of material which retains many asbestos-like properties but which is not fibrous in nature. When 90% or more of chrysotile asbestos is converted in accordance with the method of the present invention, the remaining unconverted asbestos is not sufficient to impart a fibrous nature to the product.

In a preferred embodiment of the invention, the chrysotile asbestos-containing materials are washed more than once, e.g., two times, with a 5% aqueous solution of a weak organic acid, such trifluoroacetic acid, to achieve more than 98% conversion of the chrysotile asbestos. Thereafter, a stabilizing agent is applied to the materials. The stabilizing agent comprises a resin in combination with a sodium silicate material. When this is done, the stabilizing agent binds the resulting particles together and prevents them from becoming airborne. The building materials may then be left in place while still retaining their insulating and fire retardant properties.

DETAILED DESCRIPTION OF PREFERRED EMBODIMENTS

Figure 1:
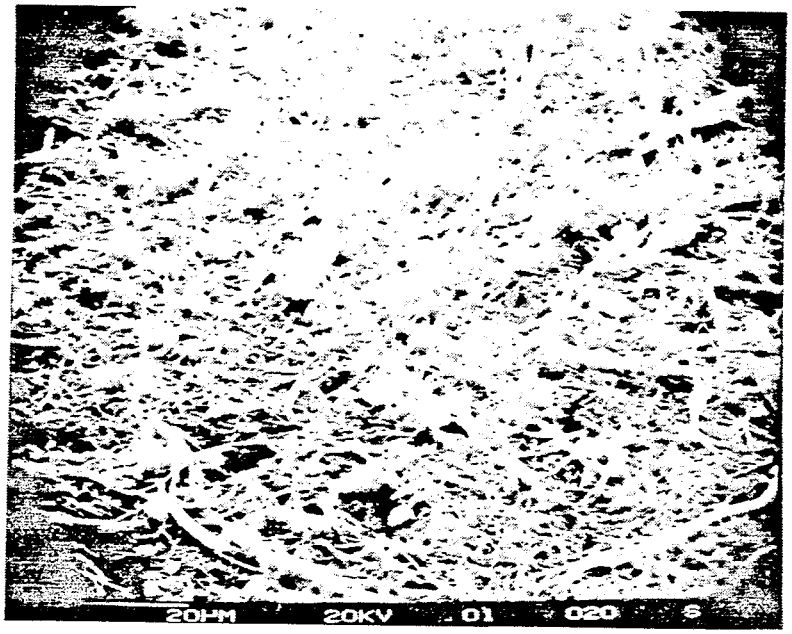
FIGS. 1-3 are photomicrographs of untreated chrysotile asbestos fibers at magnifications of $1000\times$, $5000\times$, and $10,000\times$ respectively.
Figure 2:
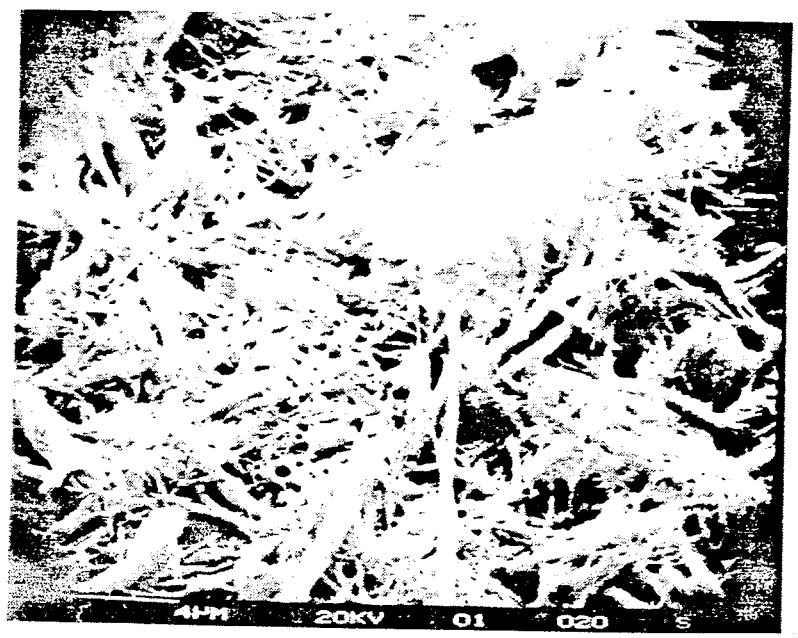
Figure 3:

The present invention is most specifically applicable to the chrysotile form of asbestos. Referring to FIGS. 1-3, untreated chrysotile asbestos is shown at magnifications ranging from $1000\times$ to $10,000\times$. The serpentine fibers characteristic of chrysotile asbestos are clearly evident in these photomicrographs. The harmful effects of these fibers is well documented at this time.

In accordance with the present invention, chrysotile asbestos such as is shown in FIGS. 1-3 is treated, for example by spraying, with an aqueous solution of a weak acid having a concentration of about 1 to 10% by weight of the weak acid. Preferably, the weak acid is a weak organic acid having a pH in the range of about 3 to 6. Among the weak organic acids which have been used successfully in accordance with this invention are acetic acid, p-cyanobenzoic acid, trifluoroacetic acid, and lactic acid.

Figure 4:
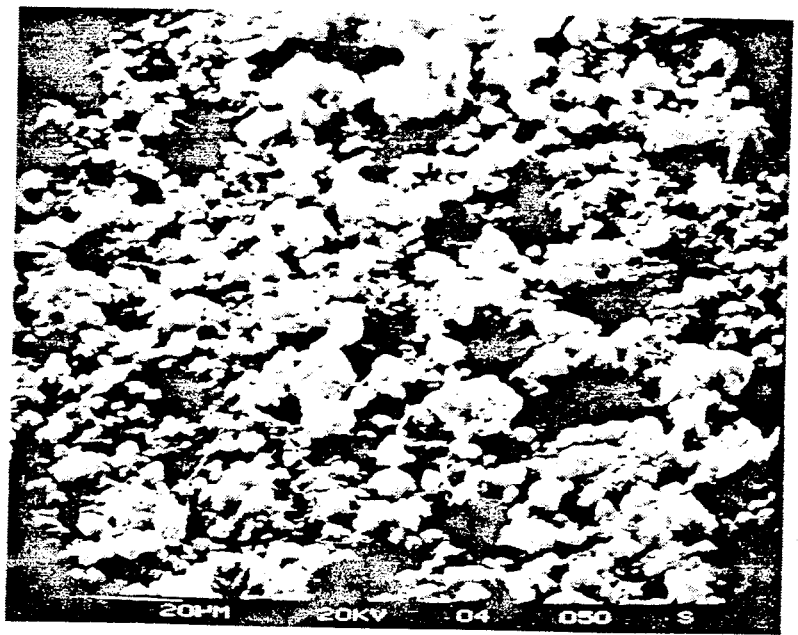
FIGS. 4-6 are photomicrographs of chrysotile asbestos after treatment in accordance with the process of the present invention at magnifications of $1000\times$, $5000\times$, and $10,000\times$ respectively.
Figure 5:
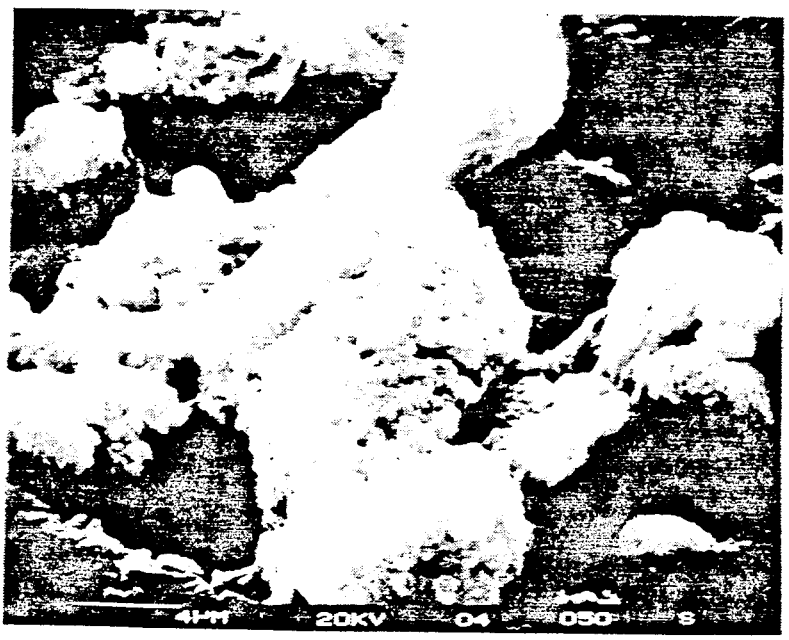
Figure 6:
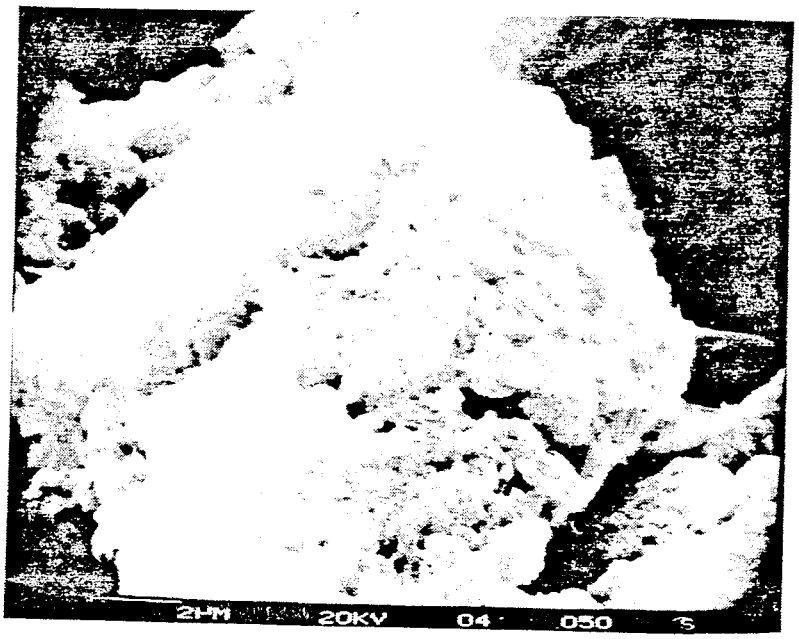

The inventive method relies upon the fact that the crystalline structure of chrysotile asbestos consists of a polymeric silica backbone interspersed with MgO units. Washing chrysotile asbestos with a weak acid results in the acid hydrolysis of the MgO units to $Mg(OH)_2$ which is leached out of the structure while leaving the silica backbone intact. This destroys the original crystalline structure of the chrysotile asbestos. The new crystal structure does not result in a fibrous material, but in amorphous particles which are sand-like in chemical composition and in structure. The resulting particles retain most of the fire-retardant and thermal insulation properties of asbestos. FIGS. 4-6 show chrysotile asbestos at magnifications ranging from $1000\times$ to $10,000\times$ after treatment with a 5% aqueous solution of trifluoroacetic acid in accordance with the method of the present invention.

FIGS. 4-6 show the dramatic difference resulting from treatment of chrysotile asbestos with a weak acid solution in accordance with the method of the present invention. The fibrous nature of chrysotile asbestos is destroyed while the resulting particles are no more harmful than ordinary sand particles.

Depending on the weak acid that is chosen and its concentration, it is possible to achieve more than 90% reduction of the crystallinity of chrysotile asbestos by means of the present invention. All that is necessary is to wet the chrysotile fibers with the weak acid solution. This can be done in situ by spraying the weak acid solution directly onto building materials which contain chrysotile asbestos. In some cases it may be necessary to open up the building structures in order to expose the fibers. So long as the weak acid solution can penetrate into the building materials so as to wet the chrysotile fibers, a significant reduction in crystallinity can be achieved. In order to improve the wetting process, it is desirable that a wetting agent be added to the weak acid solution. For example, an anionic surfactant, such as sodium dodecyl sulfate or a non-ionic surfactant such as Surfynol 465, a product sold by the Air Products Company, can be added to the weak acid solution in conventional amounts (e.g., in amounts 1% by weight) to increase wetting of the chrysotile fibers.

Table 1 sets forth a number of weak organic acids that have been used in accordance with the present invention to reduce the crystallinity of chrysotile asbestos. Table 1 also sets forth the degree of reduction in crystallinity of chrysotile fibers as measured using energy dispersive x-ray analysis (EDXRA).

TABLE 1

| Acid | Concentration (in wt. %) | Reduction of Crystallinity |
| --- | --- | --- |
| p-Trifluoromethyl benzoic acid | 0.6% | <10% |
| Acetic acid | 5% | 30-90% |
| p-Cyanobenzoic acid | 1% | 90% |
| Trifluoroacetic acid | 5% | ≧98% |
| Lactic acid | 5% | 95% |

The conversions shown in Table 1 take place in periods ranging from 2 days to 4 weeks. In large measure, these long periods of time are caused by the slow nature of the reaction. Some acids, such as trifluoroacetic acid, react much faster than others. In some cases, the slow reaction is due to the difficulty in actually wetting the chrysotile fibers contained therein. For example, it is much easier to wet the exposed chrysotile fibers in pipe insulation than in floor tile.

In order to ensure that as much conversion as possible will take place, the chrysotile fibers are subjected to successive washings with the weak acid solution. Thus, after wetting the chrysotile-containing materials a first time with the wetting solution and allowing the hydrolysis reaction to proceed for 24 hours, the materials can be washed with the acid solution a second time. The second washing should be with the same weak acid solution. Furthermore, it has been found that the wetting solution should be applied in an amount ranging from about 2 parts to 10 parts by volume of the wetting solution per part of chrysotile asbestos, the most effective solution being about 5 parts by volume of the acid solution to 1 part of asbestos material.

Once the chrysotile fibers are treated with the weak acid solution to convert them into the particles as shown in FIGS. 4-6, it is desirable to fix these particles into place by applying a stabilizing or fixing agent to the particles. This prevents the particles from becoming airborne in the manner of dust particles. The stabilizing agent should contain a resin-like material, such as a latex resin, as a binder as well as a basic material for neutralizing any excess acid which remains on the particles.

Desirably, the stabilizing agent also contains a sodium silicate material which helps to bind the material as well as to add hardness to the material. A suitable stabilizing agent comprises about 25% by volume N- sodium silicate, 25% by volume acrylic latex (Rohm and Haas), 5% by volume latex (BF Goodrich), 10% by volume alkaline cleaner (Du Bois), 5% by volume water softener (Calgon), 5% by volume wetting and dispersing additive (Byk), and 25% by volume water. The stabilizing agent is applied after the second washing has been applied, but before it has completely dried. It should be applied in situ to building materials first vertically and then horizontally. The stabilizing agent requires about 4 to 8 hours to cure, depending on the atmospheric humidity.

The invention will now be described by reference to the following examples:

EXAMPLE 1

A 5% by weight aqueous solution of trifluoroacetic acid was applied to various different kinds of chrysotile-containing building materials. Different building materials required different reaction times. When thermal insulation, such as used for insulating pipe runs and boilers, was washed a first time with the acid solution, allowed to penetrate for 24 hours, and then washed a second time with the solution, a reduction in crystallinity of 98% or greater was achieved in periods ranging from 2 to 4 days.

EXAMPLE 2

Thermal insulation was washed successively with a 5% solution of acetic acid and resulted in a 90% reduction in crystallinity of the chrysotile. However, the time required for such conversion was approximately 3 to 4 weeks.

EXAMPLE 3

A 5% solution of lactic acid was used to wash chrysotile-containing thermal insulation. Successive washings resulted in a 95% reduction of the chrysotile crystalline structure.

EXAMPLE 4

A 1% solution of p-cyanobenzoic acid resulted in an approximately 90% reduction in the crystallinity of the chrysotile asbestos.

EXAMPLE 5

A 5% solution of p-cyanobenzoic acid resulted in a reduction of 90% of the crystallinity of chrysotile asbestos in about 18 hours. However, no further increases in crystallinity reduction were achieved even after additional washings.

EXAMPLE 6

A 0.6% solution of p-trifluoromethyl benzoic acid resulted in only a small reduction in crystallinity of the chrysotile asbestos.

EXAMPLE 7

The experiments of Example 6 were repeated with a 5% solution of p-trifluoromethyl benzoic acid. The results were not significantly better.

While the invention has been described by reference to specific embodiments, this was for purposes of illustration only and should not be construed to limit the spirit or the scope of the invention. Those skilled in the art will recognize that numerous alternative embodiments are within the scope of the invention.

I claim:

1. A method for abating chrysotile asbestos present in the form of asbestos containing building materials forming part of a building or other structure, by converting chrysotile asbestos contained in said building materials into a substantially non-asbestos material, comprising the steps of:

wetting said building materials with sufficient weak organic acid such that at least about 90% of said chrysotile asbestos is converted to a non-asbestos material by the steps including:

wetting said building materials while still part of said building or other structure, with an aqueous solution containing between about 1% and 10% by weight of a weak organic acid and having a pH of less than about 6; and thereafter wetting said building materials with sufficient additional amounts of an aqueous solution of a weak organic acid for a sufficient time to convert at least 90% of the initially present chrysotile asbestos to a non-asbestos material.

2. The method of claim 1 wherein said weak acid is selected from the group consisting of acetic acid, p-cyanobenzoic acid, trifluoroacetic acid, lactic acid, and mixtures and derivatives thereof.

3. The method of claim 1 wherein said solution contains about 5% by weight of said weak acid.

4. The method of claim 1 wherein said weak solution has a pH in the range of about 3 to 6.

5. The method of claim 1 wherein one part by volume of chrysotile asbestos are contacted with an amount ranging from about 2 parts to about 10 parts by volume of said solution.

6. The method of claim 1 wherein one part by volume of chrysotile asbestos are contacted with about 5 parts by weight of said solution.

7. The method of claim 1 further comprising contacting said building materials after the completion of said wetting step with a stabilizing agent comprising a sodium silicate and a latex resin.

8. The method of claim 7 wherein said stabilizing agent further includes a base for neutralizing any excess acid on said substrate.

9. The method of claim 8 wherein said base is an alkaline soap.

10. The method of claim 1 wherein said weak acid comprises trifluoroacetic acid.

11. The method of claim 1 wherein the crystallinity of the treated chrysotile asbestos is reduced by at least about 98%.

12. The method of claim 1 wherein said step of wetting said building materials includes subjecting and building materials to a plurality of successive washings with an aqueous solution containing more than 1% by weight of a weak organic acid.

13. The method of claim 12 wherein the crystallinity of the treated chrysotile asbestos is reduced by at least 98%.

* * * * *